Patented Feb. 15, 1938

2,108,377

UNITED STATES PATENT OFFICE 2,108,377

PRODUCTION OF AMMONIUM CHLORIDE CRYSTALS

Charles H. Heimbach, Elyria, Ohio, assignor to National Tube Company, a corporation of New Jersey No Drawing. Application November 24, 1936, Serial No. 112,608

3 Claims. (Cl. 23—100)

This invention is a continuation in part of my application entitled "Production of crystals", filed July 25, 1936 and bearing Serial No. 92,693, and is concerned with the crystallization of ammonium chloride from aqueous solutions, one of the objects being to improve the character of the crystals produced.

According to the invention, cadmium is added to a solution of ammonium chloride in such form that it dissolves in the latter. The crystals produced from this solution will be found to be glassy and solid.

A specific example of the above may consist in adding .10 per cent by weight of cadmium chloride to a water solution of ammonium chloride which is saturated with the latter salt at 100 degrees centigrade. When this solution is allowed to cool naturally the glassy solid crystals are formed instead of the light and feathery crystals which would normally result. Furthermore, crystals produced from the solution containing the cadmium salt are substantially larger than can be obtained from a simple water solution of ammonium chloride.

The percentage of cadmium chloride given above may be materially reduced and still produce a decided improvement in the size and quality of the crystals obtained. As little as .02 per cent by weight of cadmium chloride when added to a water solution of ammonium chloride saturated at 100 degrees centigrade is effective.

It has been found that the crystals obtained are larger when the ammonium chloride solution is alkaline than when it is acid. However, the use of a cadmium salt results in the production of better crystals regardless of whether the solution is acid, alkaline or neutral.

In the operation of this method, a considerable amount of the cadmium is occluded in the sal ammoniac crystals, and therefore lost. It has been discovered that the addition of an alkali phosphate to the sal ammoniac solution along with the cadmium salt referred to reduces the amount of cadmium occluded in the sal ammoniac crystals, while retaining the same size of crystal, and allows the use of less cadmium salt in the ammonium chloride solution to produce the same size of crystal.

While other phosphates produce this result to some extent, di-basic ammonium phosphate, $(NH_4)_2HPO_4$, has given the best results. The amount used may vary within wide limits without any noticeable change in the size of crystal, but .5 per cent based on the weight of the sal ammoniac solution is ample.

Following are typical results of use of cadmium with di-basic ammonium phosphate in producing the same crystal size:

| | Percent |
|---|---|
| Cadmium chloride in sal ammoniac solution | 0.05 |
| Di-basic ammonium phosphate | 0.0 |
| Cadmium chloride in sal ammoniac crystals | 0.215 |
| Cadmium chloride in sal ammoniac solution | 0.02 |
| Di-basic ammonium phosphate | 0.5 |
| Cadmium chloride in sal ammoniac crystals | 0.119 |

I claim:

1. A method of producing ammonium chloride crystals, including dissolving cadmium chloride and di-basic ammonium phosphate in a solution of ammonium chloride and producing said crystals from said solution.

2. A method of producing ammonium chloride crystals, including dissolving cadmium chloride and di-basic ammonium phosphate in an alkaline solution of ammonium chloride and producing said crystals from said solution.

3. A method of producing ammonium chloride crystals, including dissolving cadmium chloride and di-basic ammonium phosphate in a solution of ammonium chloride and producing said crystals from said solution, the amount of said phosphate being approximately .5 per cent based on the weight of said ammonium chloride solution.

CHARLES H. HEIMBACH.